US011605231B2

(12) United States Patent
Velipasalar et al.

(10) Patent No.: US 11,605,231 B2
(45) Date of Patent: Mar. 14, 2023

(54) LOW POWER AND PRIVACY PRESERVING SENSOR PLATFORM FOR OCCUPANCY DETECTION

(71) Applicants: Senem Velipasalar, Fayetteville, NY (US); Sek Meng Chai, Princeton, NJ (US); Aswin Nadamuni Raghavan, Princeton, NJ (US)

(72) Inventors: Senem Velipasalar, Fayetteville, NY (US); Sek Meng Chai, Princeton, NJ (US); Aswin Nadamuni Raghavan, Princeton, NJ (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 59 days.

(21) Appl. No.: 16/573,499

(22) Filed: Sep. 17, 2019

(65) Prior Publication Data

US 2020/0089967 A1 Mar. 19, 2020

Related U.S. Application Data

(60) Provisional application No. 62/732,072, filed on Sep. 17, 2018.

(51) Int. Cl.
*G06V 20/52* (2022.01)
*G08B 13/193* (2006.01)
(Continued)

(52) U.S. Cl.
CPC ........... *G06V 20/53* (2022.01); *G06T 3/4046* (2013.01); *G06T 7/215* (2017.01); *G06T 7/70* (2017.01);
(Continued)

(58) Field of Classification Search
CPC .......... G06K 9/00778; G06K 9/00369; G06K 9/00362; G06K 9/00335; G08B 13/193;
(Continued)

(56) References Cited

U.S. PATENT DOCUMENTS

2013/0216094 A1* 8/2013 DeLean ................. G06V 40/20
382/103
2013/0272548 A1* 10/2013 Visser .................. G06V 10/454
382/103
(Continued)

*Primary Examiner* — Amandeep Saini
(74) *Attorney, Agent, or Firm* — David L. Nocllly

(57) ABSTRACT

A low-cost, low-power, stand-alone sensor platform having a visible-range camera sensor, a thermopile array, a microphone, a motion sensor, and a microprocessor that is configured to perform occupancy detection and counting while preserving the privacy of occupants. The platform is programmed to extract shape/texture from images in spatial domain; motion from video in time domain; and audio features in frequency domain. Embedded binarized neural networks are used for efficient object of interest detection. The platform is also programmed with advanced fusion algorithms for multiple sensor modalities addressing dependent sensor observations. The platform may be deployed for (i) residential use in detecting occupants for autonomously controlling building systems, such as HVAC and lighting systems, to provide energy savings, (ii) security and surveillance, such as to detect loitering and surveil places of interest, (iii) analyzing customer behavior and flows, (iv) identifying high performing stores by retailers.

16 Claims, 15 Drawing Sheets

(a)

(b)

(c)

(51) Int. Cl.
*G06T 7/215* (2017.01)
*G06T 7/70* (2017.01)
*G06T 3/40* (2006.01)
*G08B 21/18* (2006.01)
*G06V 40/10* (2022.01)

(52) U.S. Cl.
CPC ......... *G06V 40/103* (2022.01); *G08B 13/193* (2013.01); *G08B 21/182* (2013.01); *G06T 2207/10048* (2013.01)

(58) Field of Classification Search
CPC .............. G08B 21/182; G08B 21/0469; G08B 29/188; G08B 13/19; G06T 7/215; G06T 7/70; G06T 3/4046; G06T 2207/10048; H04N 5/2258; G06V 20/53; G06V 40/103; G06V 40/10; G06V 40/20

USPC ......................................................... 382/103
See application file for complete search history.

(56) References Cited

U.S. PATENT DOCUMENTS

| | | | |
|---|---|---|---|
| 2013/0279750 A1* | 10/2013 | Zhou | G06T 7/0002 382/103 |
| 2015/0146927 A1* | 5/2015 | Cebron | G06V 10/751 382/103 |
| 2016/0228040 A1* | 8/2016 | Atarashi | A61B 5/1117 |
| 2017/0186291 A1* | 6/2017 | Wenus | G01S 3/786 |
| 2017/0286830 A1* | 10/2017 | El-Yaniv | G06N 3/0454 |
| 2018/0204317 A1* | 7/2018 | Correia e Sa Neto | G06T 7/0004 |
| 2019/0333232 A1* | 10/2019 | Vallespi-Gonzalez | G06N 20/00 |

* cited by examiner

LOW POWER AND PRIVACY PRESERVING SENSOR PLATFORM FOR OCCUPANCY DETECTION

CROSS-REFERENCE TO RELATED APPLICATIONS

The present application claims priority to U.S. Provisional App. 62/732,072, filed on Sep. 17, 2018.

STATEMENT REGARDING FEDERALLY SPONSORED RESEARCH OR DEVELOPMENT

This invention was made with government support under DE-AR0000940 awarded by the U.S. Department of Energy. The government has certain rights in the invention.

BACKGROUND OF THE INVENTION

1. Field of the Invention

The present invention relates to occupancy detection and counting sensors and, more specifically, a stand-alone occupancy detection and counting sensor platform that combines visible-range imaging (covering very-low resolution to higher resolution images), thermal imaging, and microphone data for robust occupancy detection and counting with reduced power consumption, onboard computation and privacy safeguards.

2. Description of the Related Art

Some conventional thermostats rely on sensors with motion sensing capabilities for determining whether there are people in a given location. These thermostats are based on motion sensors and are thus limited in their capability, since they are prone to false negatives, cannot detect a person that is not in motion, and cannot identify the source of the motion, e.g. cannot differentiate pets from people. Camera and video-based approaches for person detection and tracking can be used, but these systems are costly, not easily portable, sensitive to lighting changes, and thus are prone to high false alarm rates or misdetections. In addition, depending on the camera resolution and employed algorithms, the systems may not allow for embedded or onboard computation and thus require external processing of captured images. These systems also overlook the privacy concerns of occupants as the images, which are transferred to an external computation unit to detect people, can be obtained illicitly or accessed without the knowledge of the occupant. Regardless of where the processing occurs, the use of significant computing resources also increases power demands. Thus, there is a need in the art for a sensor that: (i) sufficiently addresses privacy and security issues; (ii) can be used for different scenarios; (iii) provides high accuracy; (iv) is inexpensive; (v) is easy to deploy and (vi) does not require a significant amount of power for operation.

BRIEF SUMMARY OF THE INVENTION

The present invention is a low-cost, low-power, stand-alone platform that is equipped with a camera sensor (which could be a very-low resolution sensor), a thermopile array (low-resolution infrared array sensor), a microphone, a motion sensor and a microprocessor. The platform is configured to perform occupancy detection and counting while preserving the privacy of occupants. More specifically, the platform includes a microprocessor that is programmed to extract shape/texture from images in spatial domain; motion from video in time domain; and audio features in frequency domain. Embedded binary neural networks (eBNNs) are used for efficient person detection. The platform is also programmed with advanced fusion algorithms for multiple sensor modalities, such as the visible-range camera, the thermopile array, and the microphone, as well as for multiple visual modalities. The platform may be deployed as multiple units for residential use in detecting occupants or for commercial use in counting occupants. The stand-alone platform of the present invention provides robust detection and counting of people, can differentiate people from animals, and includes multi-modal sensor fusion algorithms that address dependent sensor observations to provide reliable performance locally on an embedded processor while providing for occupant privacy. The capabilities of the present invention can be very useful for applications such as providing at least a 30 percent energy savings in residential and commercial building due to smart controlling of HVAC systems, improving security and surveillance, and monitoring occupants such as elderly people that may be living by themselves.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
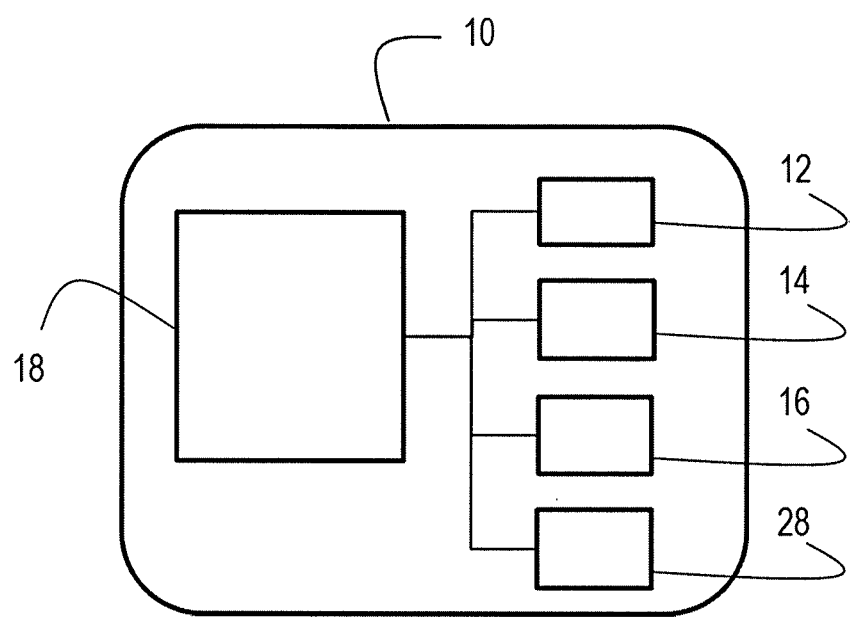
FIG. 1 is a schematic of a platform according to the present invention.

Referring to the figures, wherein like numerals refer to like parts throughout, there is seen in FIG. 1A, a platform 10 that is equipped with an optical imager 12, such as a camera sensor (which could be a very-low resolution or regular resolution sensor). Platform 10 further comprises an infrared sensor 14, such as a thermopile array (low-resolution infrared array sensor) or high resolution infrared sensor that can output an infrared image. Low-resolution thermopile arrays may be used to detect the presence of stationary objects and provide a direction of movement of objects within the field of view (FOV). The use of a thermopile array having multiple IR sensing elements working together also allow for measurement of absolute temperatures as well as temperature gradients. Platform 10 further comprises a microphone 16 for outputting signals reflecting any detected sounds, a motion sensor 28 for triggering the other sensors and increasing battery life of the unit, and an embedded processor 18 for analyzing the outputs of optical imager 12, infrared sensor 14, and microphone 16. Referring to FIG. 1B, multiple platforms 10 may be interconnected via a central hub 20 having a display 22 and central processor 24. Hub 20 may be interconnected to a conventional building system, such as an HVAC system 26, to allow for customized HVAC control based on the determination by any platform 10 or, collectively, hub 20 that a human is in (or is not in) the location such that the HVAC system should be operated differently so that at least 30% energy saving can be obtained over a year Processor 18 is programmed with the detection algorithms that decrease failure rates (number of missed detections≤2 per year), and increase reliability (>95% confidence) by utilizing different sensor modalities as well as shape, texture, motion and sound signatures. Processor 18 may also be programmed with advanced fusion algorithms that address the dependency in the data captured by multiple sensor modalities. Platform 10 is preferably wireless and can be affixed to a location, such as a ceiling, allowing for easy self-commissioning.

Processor 18 is programmed for autonomous and reliable occupancy detection and counting, and differentiating pets from people in very-low resolution as well as regular resolution images. Platform 10 may be battery-operated. Processor 18 is programmed to perform an analysis of data from different sensor modalities since any method using only one modality is prone to high number of false alarms or misdetections. Thus, platform 10 utilizes multiple sensor modalities to obtain shape, texture, motion and sound signatures via lightweight algorithms, including eBNNs, and then employ advanced fusion algorithms to provide high sensing performance and extend battery life.

Figure 3:
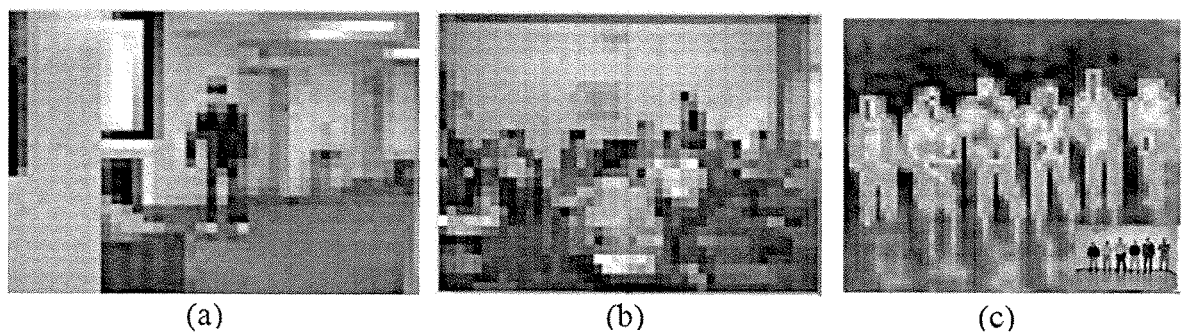
FIG. 3 is a series of images taken with various low resolution optical and infrared imagers, (a) 42×32, (b) 44×29, and (c) 32×32 pixels, respectively, for use on a platform according to the present invention.
Figure 4:
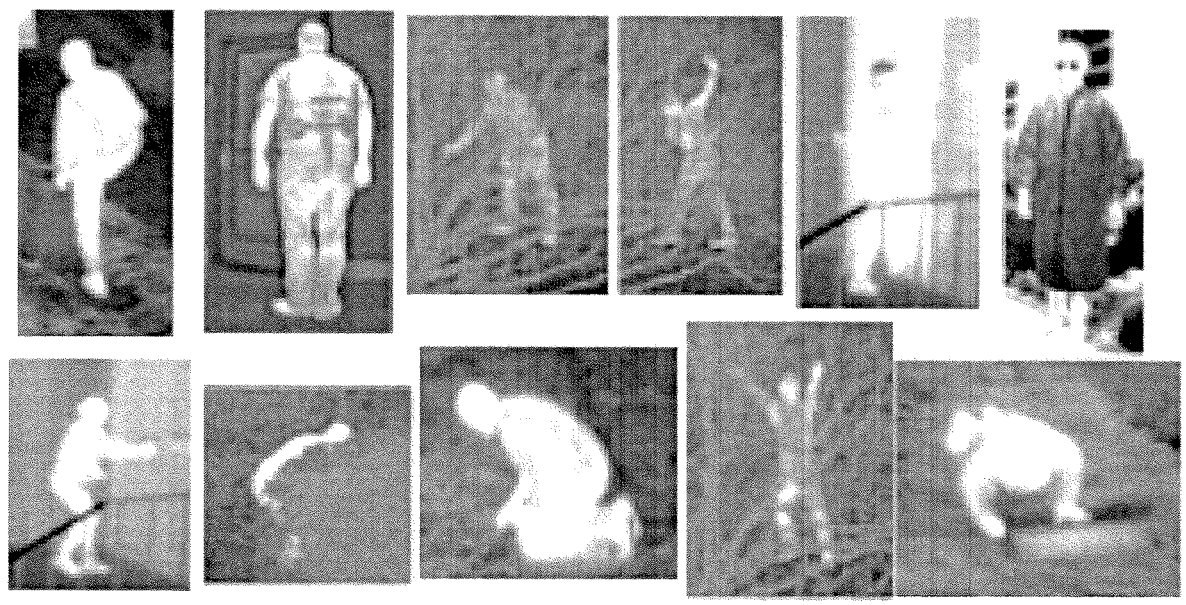
FIG. 4 is a series of infrared images exhibiting human detection for use with a sensor according to the present invention.

In one embodiment of platform 10, the captured visible-range images can have a total of 1600 pixels or less. For residential use, an 8×8 thermopile array may be used, since only a binary decision is needed. For counting, the thermopile array may be 32×32 to detect multiple people more reliably. FIG. 3 shows two example images from a visible-range camera with resolutions 42×32 pixels (a), and 44×29 pixels (b), respectively. FIG. 3 also shows an infrared image using a 32×32-pixel thermopile array (c). As illustrated, it is not possible to directly identify any particular individuals from these images. Another advantage is that, since images are very low resolution, they will not require significant computing resources and energy to process, and will allow for onboard computation by our embedded processor. In addition, having multiple modalities will allow us to develop smart sleep/wake-up scheduling strategies to decrease the power consumption even further to provide battery-powered operation for very long durations.

Platform 10 is programmed to extract information from all three sensing modalities and perform copula/vines based fusion to make a decision regarding occupancy. The fusion can be at the feature-level or decision-level, which will be decided based on the processing power and energy constraints and minimizing the probability of error while maintaining a low operating cost, thereby making platform 10 extremely energy efficient for prolonged battery life.

The ideal location for platform 10 is on a wall with the view of the entry/exit point of a place. The low cost of the developed platform will allow the deployment of a unit in every room, near the entry/exit points in a house, and also multiple units per room. Budget constraints will determine the allowable number of units to be deployed in a residential or commercial building. Sensor deployment and placement will be considered to maximize coverage and minimize misdetections while minimizing the probability of false positives.

Figure 2:
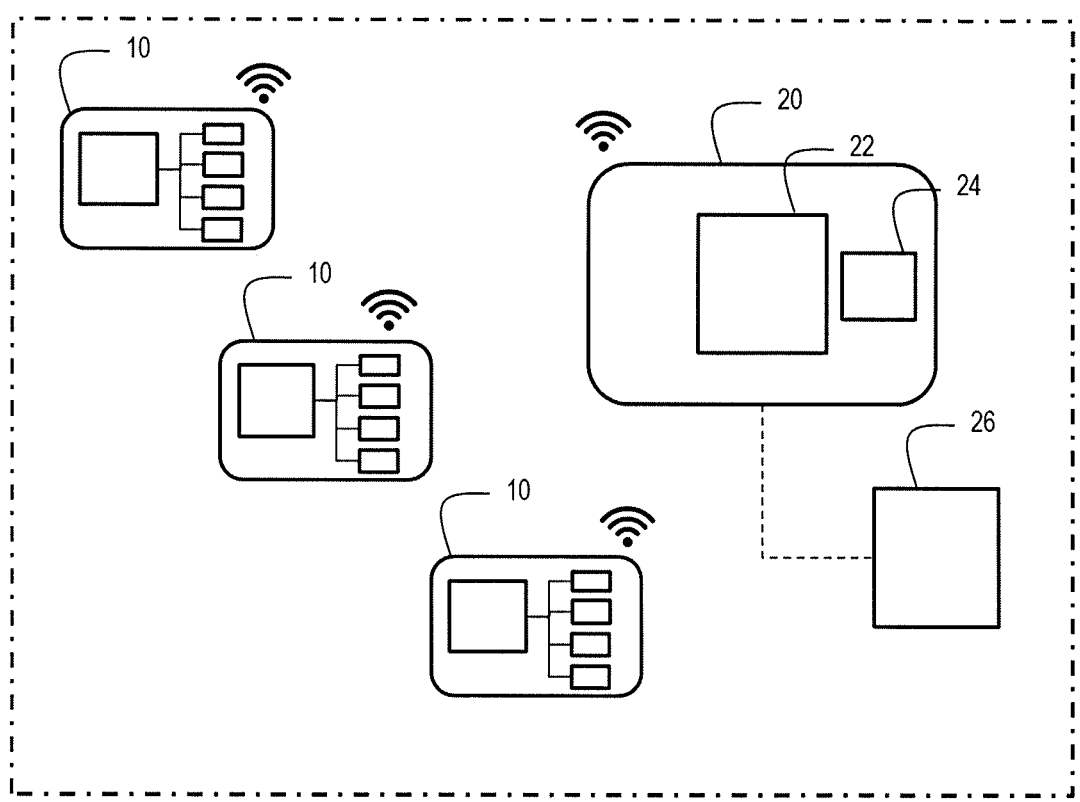
FIG. 2 is schematic showing multiple platforms in combination according to the present invention.

In the embodiment illustrated in FIG. 2, occupancy detection and/or counting will be performed by each platform 10 by incorporating multi-modal sensor fusion. These platforms 10 may then collaborate to make a global decision, based on decision-level fusion performed on by system hub 20 to ensure increased accuracy, and decrease false positive alarms. For a residential scenario, the algorithms of the present invention can be configured to only detect the presence of humans, and the output of the system may be a 1 or 0, indicating the existence/non-existence of occupant(s), for easy use by second systems such as HVAC system 26. The focus of failure analysis will be to prevent missed detections (false negatives). For commercial buildings, the infrared image size can be increased, more units can be deployed (in accordance with the cost requirements), and person-counting algorithms may be implemented such that the output is the number of people in a room. Once again, using multiple modalities will be instrumental to successfully segment and count multiple people. In both scenarios, the output may be displayed on the system hub, and communicated via wireless protocol, such as Bluetooth, to a central controller, as seen in FIG. 2.

Platform 10 thus provides a high return for the homeowners/customers, in terms of significant savings (>30%) in energy consumption, for a low-cost, low-maintenance investment. Platform 10 may be completely wireless, low-power and battery-powered, and easily affixed to a wall for easy self-commissioning. For example, platform 10 may operate on three AA batteries in residential settings with minimum maintenance required. Platform 10 also provides higher accuracy than the existing systems by meeting conventional failure rate requirements and is composed of commercial off-the-shelf (COTS) components, allowing to move to market quickly and in a cost-effective way. Platform 10 employs a low-power embedded processor so that platform 10 does not need to rely on external computation units or cloud computing. By processing data locally, not saving any data, and not transferring any data to an external location, and with the capability of processing very-low resolution images, platform 10 addresses privacy and security issues at the platform-level and also avoids saving or transmitting any data (audio or video). Platform 10 can provide for both occupancy detection and occupancy counting, and thus can be used for both residential and commercial markets. High accuracy and robustness are achieved on a stand-alone platform 10 by utilizing multiple sensor modalities, namely camera, thermopile array, microphone, and motion sensor, and shape, texture, motion and sound signatures; providing capability to process very-low resolution images; designing lightweight and robust algorithms; employing advanced fusion algorithms by taking the dependence among multi-modal sensor observations into account; performing computations on an embedded processor; and using smart sleep/wake-up scheduling methodologies.

If deployed in single-family residences, a 30 percent energy savings would translate to 1.66 Quad BTUs. Similar saving could be seen in office environments. Success rates for occupancy detection using platform 10 will demonstrate significant energy savings for standard commercial and residential environments. In addition, platform 10, with its multi-modal sensors and lightweight and robust algorithms, will have significant impact not on the residential and commercial energy usage, but also on other important applications areas including safety, retail industry and surveillance. It can be used to detect loitering; surveil places of interest, e.g. detect people in buildings after hours; analyze customer behavior and flows, and identify high performing store by retailers. Platform 10 thus provides a high return for the homeowners/customers, in terms of significant savings (>30%) in energy consumption, for their low-cost, low-maintenance investment.

Employing four different sensor modalities allows for better segmentation from the background even in stationary cases, and better counting, and multi-modal sensor fusion significantly increases the detection rate (>0.99) and decreases false alarm rates. Also, it allows the development of smart sleep/wake-up scheduling strategies to decrease the power consumption even further to provide battery-powered operation for long durations.

Analysis from different modalities and fusion are especially needed, since any method using only one modality is prone to high false alarms or missed detections. For instance, a simple portrait or people on TV screen can easily fool any traditional shape-based analysis, and a static person will not be detected by only motion-based methods. Infrared imaging provides information in this case about occupants' body temperatures for discrimination from background (BG) objects and allows detection even when occupants are not moving for extended periods of time. Similarly, a TV that is left on would create false alarms if a solution only relies on a microphone. The approach of platform 10 extracts sound signatures, detects shape/texture from videos in spatial domain and motion in temporal domain; and employs multi-modal fusion to meet the performance requirements.

Rather than following the traditional trend of having ever-increasing camera resolutions, platform 10 can employ a very low-resolution camera (capturing on the order of 40×40 pixels) and thermopile array (8×8 residential or 32×32 commercial). Benefits of having very-low resolution sensors are threefold and allows for: (i) addressing the issue of occupant privacy at the sensor-level in a much more efficient and effective way, since it is not possible to identify individuals from these images; (ii) onboard processing and significant computational savings, which, in turn, provides longer battery life and allows for less expensive embedded processor (e.g., VGA-sized images are 192 times larger than a 40×40 image, suggesting similar reduction in computational load); (iii) decreasing sensor costs, and the ability to have multiple units at the same time.

Platform 10 detects people and differentiates them from pets in images that could be regular or very-low resolution. Relying on the traditional approach of performing background subtraction based on pixel intensities makes the algorithm very sensitive to lighting changes, and creates many false positives. Thus, rather than using only the pixel intensities, a hybrid approach is used to build an edge map of the environment to perform "edge subtraction" to detect foreground (FG) objects. If FG regions are detected, embedded binarized neural networks (eBNNs) are used only over those regions to decide if they correspond to person(s). For example, eBNNs may be trained using single-bit weights, gaining significant cost savings in memory and processing requirements compared to traditional 32-bit floating point deep networks, and achieving high detection performance (98%) on low-resolution images. To increase robustness and eliminate false negatives, eBNNs may be applied over the entire image, if no FG object has been detected for certain duration then Aggregate Channel Feature (ACF)-based person detection is used for hierarchical and efficient processing. Platform 10 learns the "pixel movement signatures" of people versus pets, and an ellipse is fit to the FG pixels, and an OR operation is performed between the ellipse and the corresponding FG pixels to learn a more reliable color and size distribution. Platform 10 then autonomously learns the person-size bounds. In addition, platform 10 detects head to segment people in merged blobs by incorporating data from thermal sensor. These methods allow an increase in the accuracy rate, and reduces the number of person-counting failures. Multi-modal fusion algorithms exploiting Copula theory that models dependence of sensor decisions and is suitable for heterogeneous data are implemented on a low-power embedded processor locally on platform 10 so that the solution will not rely on external computation units or cloud computing. An eBNN architecture similar to AlexNet, can be run at 0.04 s/frame, or 20 fps on platform 10.

Table 1 below includes a list of the candidate COTS components together with their cost and power specifics. Below, we discuss how these targets will be achieved. In the table, we also refer to specific sections wherein it is described how the metrics are derived and targets will be achieved.

TABLE 1

Example components together with their cost and power specifics

| Component | Example | Power (active) | Power (sleep) | Cost @ 1M pcs |
|---|---|---|---|---|
| Low-res camera | OV07676-H20A-ND | ~7 mW | 42 µW | $1.63 |
| | Optical mouse sensor | 0.46 mW | 16.5 µW | $1.75^ |
| Thermopile array (8 × 8) | Heimann HTPA8 × 8d | 1.35 mW | 0.06 mW | $5* |
| Thermopile array (32 × 32) | Heimann HTPA32 × 32 | 26.4 mW | 6.9 µW | $10* |
| Microphone | InvenSense INMP522 | 2.16 mW | 3.6 µW | $2.45 |
| Processor | ARM Cortex M3 | 4.3 mW | 1.6 µW | $2.15 |
| Bluetooth | Bluetooth Smart | 27.1 mW (Tx), 26.7 mW (Rx) | 4.62 µW | $2.25 |

*Cost extrapolated to quantity 1M,
^estimated

Based on detailed energy calculations, for the residential scenario (with 8×8 thermopile array), the total energy consumption of platform 10 will be 12.1 Watt-hours over 3 years when a 320×240 camera is used, and it will operate for 3.1 years. However, the multiple modalities will run the most energy-efficient sensor at a higher duty cycle, while decreasing the duty cycles of the others. So, assuming a 2% duty cycle for the microphone and processor and 1% for the camera sensor and the thermopile array, the energy consumption will be 9.92 Watt-hours over 3 years, and the unit will operate for 3.8 years with three AA batteries.

Physical features of residential spaces can explain approximately 30% of energy use in buildings, while about 70% can be attributed to different occupant-related consumption patterns. Simulation of an office building with Integrated Room Automation showed that up to 34% and 50% HVAC energy savings can be obtained in the case of homogeneous and alternating occupancy patterns, respectively. Success rates for occupancy detection using platform 10 will demonstrate energy savings for standard residential simulation models, as compared to a standard base case developed using US DOE models.

The present invention has the advantage of including many off-the-shelf components that keep the costs of building a device in accordance with the present invention competitive with existing technology. In addition, whether used in a residential and commercial scenario, the costs savings associated with improved location control over time will far outweigh the costs of physically outfitting the location.

Figure 9:
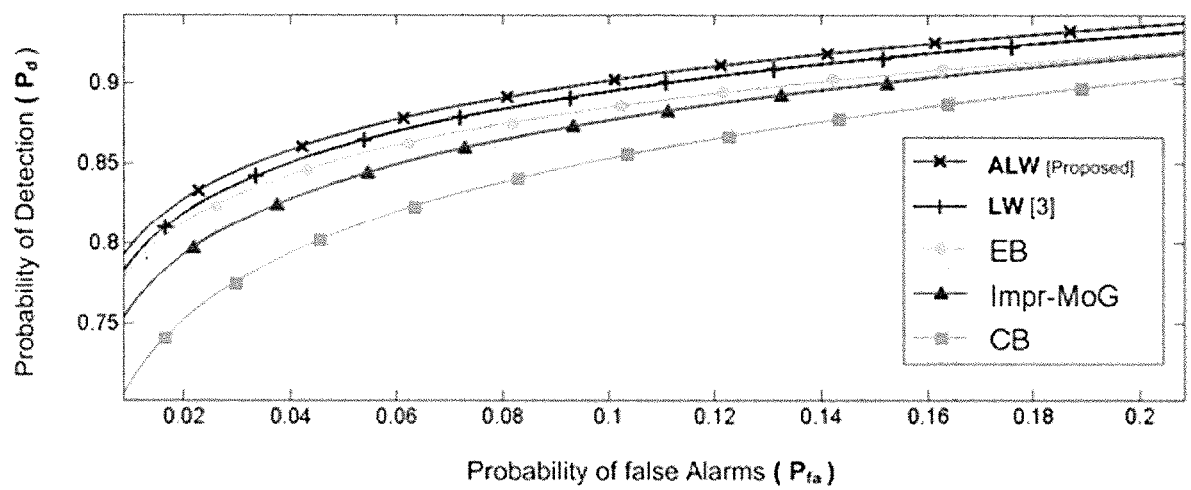
FIG. 9 is a graph of ROC curves for different background subtraction methods according to the present invention.

It is very important to identify a 'tolerable' false positive rate (FPR) to determine what true positive rate (TPR) an algorithm will/can achieve. The TPR is also known as sensitivity, recall or probability of detection in machine learning. The tolerable FPR may be determined from building performance simulations by finding the rate that will still assure at least 30% energy savings. Then, Receiver Operating Characteristic (ROC) curves may be used to determine the corresponding TPR for this tolerable FPR. An ROC curve is obtained by plotting the TPR against the FPR at various threshold settings. Preliminary studies with proposed algorithms and ROC curves were performed and, as seen in FIG. 9, a foreground detection method can achieve more than 0.95 TPR, for FPR of 0.17. An ACF-based object detection approach incorporating shape information provides the TPR (around 0.95) as region proposals with convolutional neural networks (R-CNN) at FPR rate of 0.15, while being computationally much more efficient. Moreover, the eBNN recognition accuracy was over 98% for low resolution images. In all cases, a minimum TPR of 0.95 can be achieved for relatively low FPRs, and TPR increases even more if higher FPR can be tolerated.

On the other hand, Copula-based multi-modal fusion can improve the accuracy of the seismic and acoustic sensor by 7.4% and 4.8%, respectively, for footstep detection during normal walking, and by 30.9% and 1150%, respectively, during stealthy walking. In a face recognition application, Copula-based fusion improved the accuracy of two separate algorithms having different scales as matching scores, by 5.9% and 3.8%, respectively. For platform 10 of the present invention, it is feasible to obtain a TPR of 0.95 from each of the modalities, and a 5% increase in this rate as a result of Copula-based fusion as discussed above. Thus, platform 10 is expected to achieve a TPR of 0.99 or higher.

Traditional thermal detection systems rely on hand-crafted visual features, resulting in missed detections and high false alarm rates. Deep learning algorithms have been used for object classification with great success, but current approaches are focused on images in the visible spectrum, with high resolution and contrast. Commercial deep learning systems are cloud-based and geared towards performance results at the cost of high power consumption and are less concerned with real-time operation. Thermal cameras operate day and night, but they pose additional challenges for deep learning algorithms due to the fact that images have no color cues and there are thermal variations for the same object. Small objects in different poses are difficult to identify because they "look like blobs" with little texture discrimination. The algorithmic approach of platform 10 is based on analyses in different domains by extracting complex set of features that can be semantically analyzed for human presence. In the spatial domain, we utilize deep learning algorithms for shape-based analysis. In the temporal domain, human motion is detected. In the frequency domain, the consistency of motion and shape is detected. Any visual analysis using only one domain would result in high number of false alarms. Platform 10 exploits the interactions between these domains by fusing the analyses to improve detection results and decrease false alarms.

An embedded Binary Neural Network (eBNN) can achieve 4× speedup and three orders of magnitude of power efficiency over GPUs using 32-bit floating point operations. The important feature of eBNN compared to other deep neural networks is that both weights and input activations are binarized to avoid forward and backward propagation multiplications. Thus, computationally expensive computations for convolutions and weight summations can be replaced with dot products that are essentially bit counting of two vectors, e.g., input and weights. This architecture greatly reduces the processing hardware and the amount of memory usage. Compared to 32-bit versions of the CNNs, eBNNs can achieve almost the same recognition accuracy with <1% difference.

Figure 5:
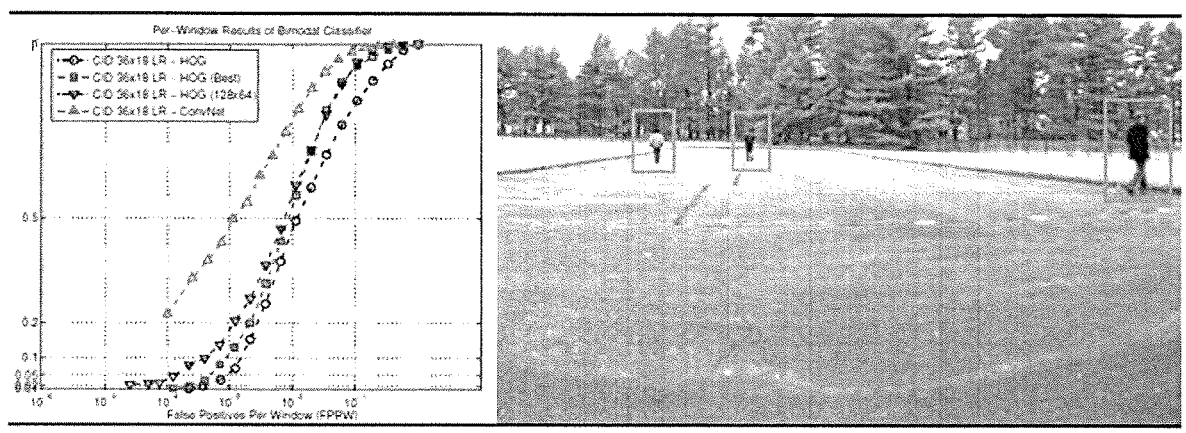
FIG. 5 is a graph of precision recall comparing conventional methods to an approach according to the present invention.

The traditional approach of using hand-crafted features was tested against a deep learning approach that was trained to extract salient features, and recognize pedestrians and vehicles. An order of magnitude improvement was demonstrated in recognition accuracy using the deep learning approach (see FIG. 5). A study of video-based human detection was performed using thermal data for SPAWAR, where the performance of a traditional thermal detection system was characterized. Test data was collected in different scenarios (pose, temperature, etc.). The performance of thermal-based sensing is very much dependent on the image contrast due to temperature difference between the BG and objects in the scene. Humans are also harder to detect in the prone position (lying down).

For platform 10 of the present invention, training data may be collected to learn rather than manually codify the visual features. Both visual features and motion cues are used to improve detection performance for training data. The key insight is to provide sufficient training data with enough layers in the deep learning network to improve algorithm robustness. The focus is to train the deep network so that the classifiers are resilient to body pose and thermal variations due to variations in clothing across the body and with the background.

Figure 6:
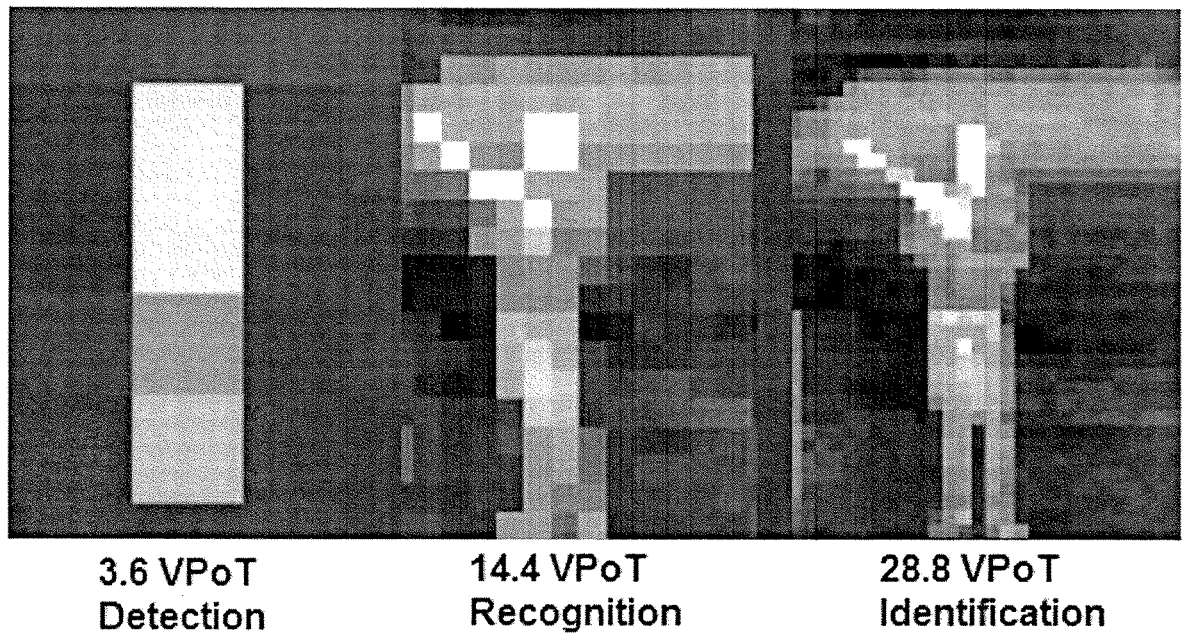
FIG. 6 is a series of thermal sensor images exhibiting vertical pixels-on-target for a person according to the present invention.

Successful detection requires "pixels on target" (PoT) to capture sufficient features for object discrimination (DRI—detection, recognition, and identification). Using the Johnson Criteria that suggests the critical dimension for detecting humans is 0.75 m, it is possible to estimate minimal DRI at a minimum 2 pixel/m for detection and 8 pixels/m for recognition. FIG. 6 depicts the example DRI with corresponding Vertical PoT. Using a multi-modal system (e.g. with visible camera and microphone), it is possible to tradeoff PoT with fusion of results from multiple modalities. For example, detection using 2-4 pixels in thermopile can boost confidence in corresponding audio detection, to achieve sufficient system performance.

Existing methods for detecting FG objects in the environment can be broadly classified into two categories: temporal difference methods, and BG subtraction methods. Temporal difference methods subtract two consecutive frames and then apply a threshold to the output. These methods cannot detect all the pixels of a moving object, and can miss FG objects that become static. BG subtraction methods build a model of the BG and subtract this from the current image to detect FG. To adapt to changes in the environment, the BG model is usually updated over time. Relying on the traditional approach of performing BG subtraction based only on pixel intensities makes the algorithm very sensitive to lighting changes, and creates many false positives. Thus, rather than using only the pixel intensities, a hybrid approach used where an edge map of the environment is built to perform "edge subtraction" to detect FG object.

Figure 7:
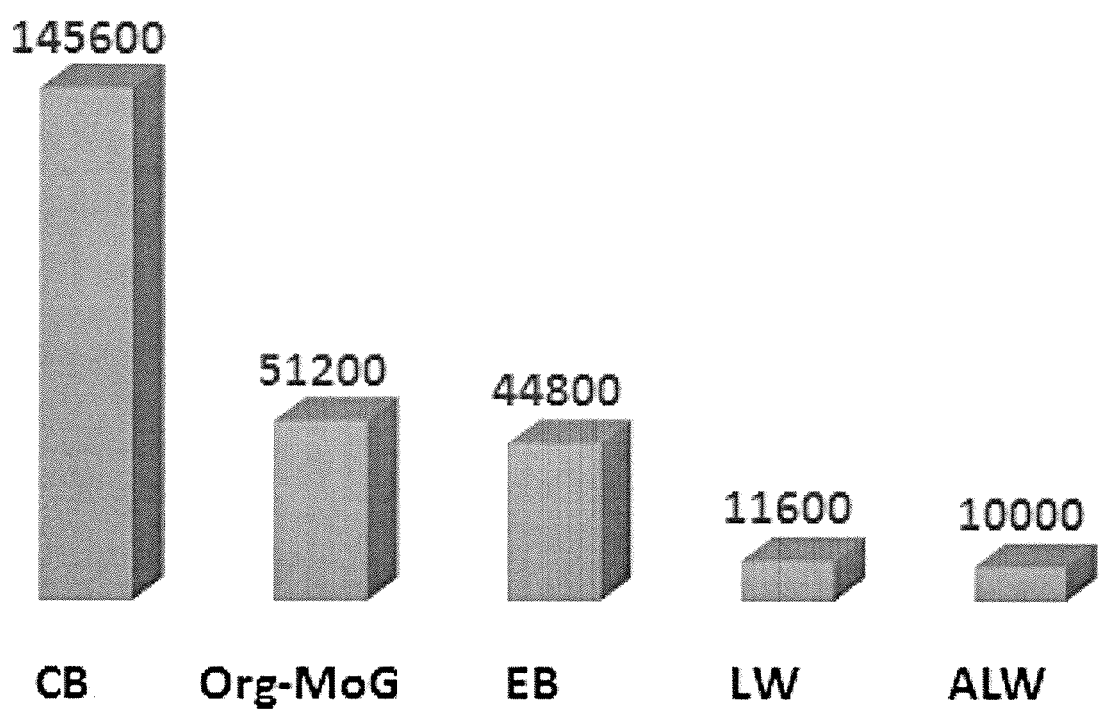
FIG. 7 is a graph of memory requirements for a 40×40 image.

Referring to FIG. 7, it has been demonstrated that, compared to many traditional methods, more specifically original Mixture of Gaussians (Org-MoG), codebook (CB), and eigen-background (EB) approaches, the memory requirement for the data saved for each pixel is very small in the algorithm (LW) to be used for platform 10 and its adaptive version (ALW). Moreover, the number of memory accesses and instructions are adaptive, and are decreased depending on the amount of activity in the scene. Each pixel is treated differently based on its history, and instead of requiring the same number of memory accesses and instructions for every pixel, we require less instructions for stable BG pixels. As opposed to traditional methods, pixels are not always treated individually and information about neighbors is incorporated into decision making when differentiating between salient and non-salient motion. At each frame, each pixel's state is set to be 0 or 1 based on its difference from the BG model. For a pixel at location (i,j), a counter h(i,j) holds the number of changes in the state of this pixel during the last 100 frames, i.e. the counter h(i,j) keeps the number of times a pixel's state changes from 0 to 1 or vice versa. The stability of a pixel at location (i,j) is determined by this counter h(i,j). The motivation is that the lower the value of h(i,j), the more stable and reliable that location is, or vice versa. As opposed to many traditional model-based background subtraction approaches, in our proposed scheme, satisfying $|I_t(i,j)-M(i,j)|>\tau$, is not enough for the location (i,j) to be classified as FG, where $I_t(i,j)$ and $M(i,j)$ are the current pixel value and model values, respectively. Instead, reliability constraints are employed to differentiate between salient and non-salient motion. This location is classified as FG if the location is not likely to be in a non-salient motion region, which is determined by checking the h(i,j) for the current and neighboring locations.

Figure 8:
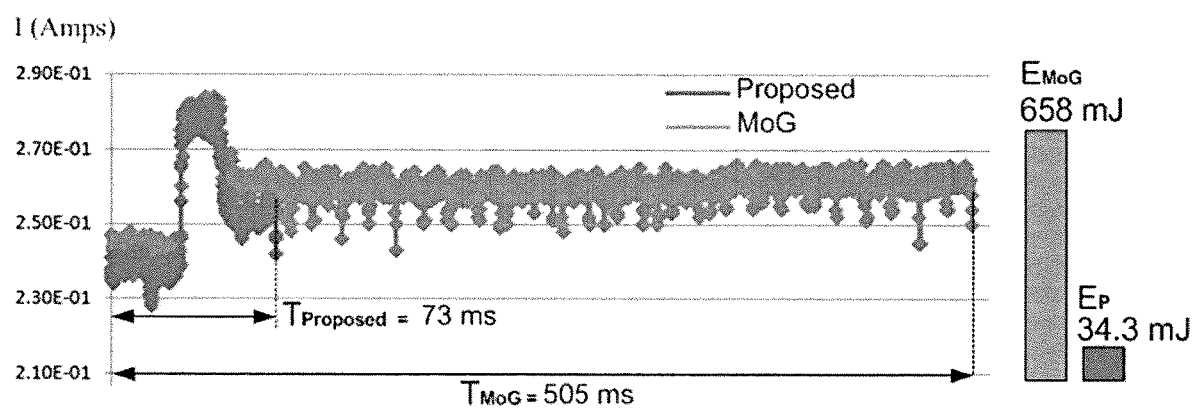
FIG. 8 is a graph of current, in amperes, drawn by a camera board, and the consumed energy, for a second according to the present invention.

FIG. 8 shows the operating current of the camera board when running the proposed algorithm and the Org-MoG, which is one of the most commonly-used approaches for FG detection, on a 240×320 image. As can be seen, this algorithm provides more than 19× savings in energy consumed when processing one frame.

This was compared with other methods in terms of the probability of detection (Pd) and probability of false alarm (Pfa) rates for FG pixels, and plotted their ROC curves for a quantitative comparison. As seen in FIG. 9, for the same Pd rate, the present invention has the least Pfa, and for the same Pfa rate it has the highest Pd.

The invention improves this approach further to increase the robustness and make it applicable to low resolution images. The invention builds an edge model of the BG, and saves an edge value e(i,j) for each pixel in addition to the counter h(i,j). A combination of these values is used to increase robustness against lighting variations, and decrease false positive rates. Computational cost can be decreased further by operating towards right of the ROC curve in FIG. 9, and applying edge detection only in the detected candidate areas.

To differentiate people from pets and any other moving objects in the scene, efficient algorithms for person detection, segmentation and counting are used. Convolutional Neural Networks (CNNs) have received a lot of attention in the computer vision community recently, especially after achieving a very good performance in the ImageNet object localization/detection challenge. Later, Girshick et al. combined region proposals with CNNs, and introduced R-CNN for object detection. Then, Fast and Faster R-CNNs were proposed, providing state-of-the-art performance in object detection. These methods are computationally more expensive, and often require a GPU for faster training and processing times. If GPU is not available, cloud or remote computing is usually presented as an alternative, which is not feasible for the low-power, stand-alone platform to be developed for this project.

Dollar et al. introduced the Aggregate Channel Features (ACF), which include various channels including LUV color channels, gradient, and gradient histogram similar to the histograms of oriented gradients (HOG). ACF-based detectors can be trained and tested much faster than R-CNN based detectors. However, for true positive values greater than 0.9, they tend to result in higher false positive rates compared to R-CNN-based detectors.

The present invention may utilize a new method for object detection from low-resolution and noisy videos, which incorporates ACF-based detection and chain code histograms (CCH), with the goals of (i) providing much faster training and testing, and comparable or better performance, when compared R-CNNs, and (ii) being computationally much more efficient, and not requiring specialized processors. CCHs is employed as the shape descriptor, to decrease the false positive rates. CCHs provide a scale and translation invariant shape descriptor for the contours of objects in binary images. An ACF-based detector was first trained with a decision tree of depth 3. The total number of training stages are 5, and the final stage has 4096 trees. CCHs were built for different traffic sign shapes by using eight directions. Thus, the histograms are composed of eight bins. They are normalized to make the shape descriptor scale invariant. The performance of the invention was compared with two other detectors, namely a pure ACF-based detector and an R-CNN-based detector, both in terms of accuracy, through ROC curves, and processing time.

Figure 10:
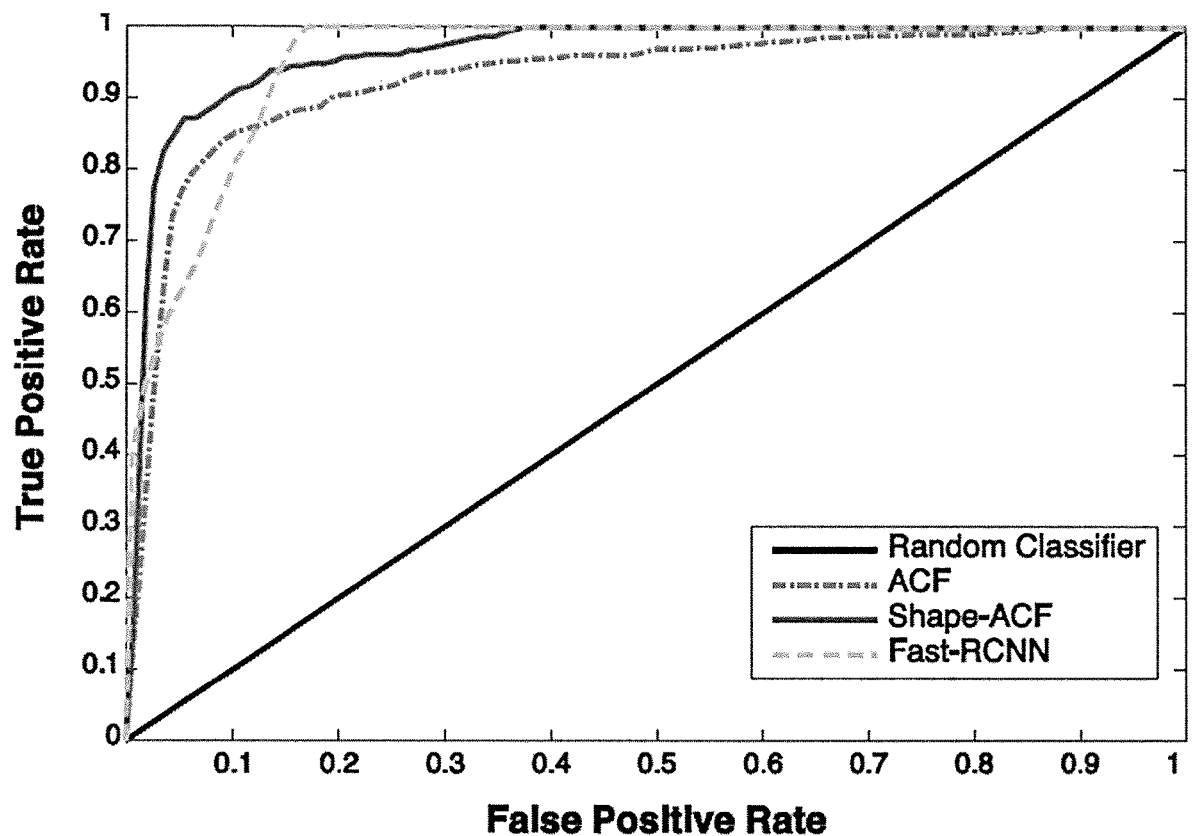
FIG. 10 is a graph of ROC curves comparing a detection approach of the present invention with conventional approaches.

As seen in FIG. 10, overall, the algorithm (shown in solid red plot) operates closer to the upper left-hand corner. For false positive (FP) rates less than 0.15, the proposed method (Shape-ACF) provides the highest true positive rate among the three detectors. The processing times on a CPU for the Shape-ACF, ACF and Fast-RCNN-based detectors are 0.15 s, 0.09 s, and 12 s, respectively, to process a single image of size 458×356. As can be seen, the proposed method (Shape-ACF) performs much faster than Fast-RCNN on a CPU providing 80× speed up. This makes the invention more suitable for CPU and/or embedded platform implementations.

As a feasibility study, a 40×40 image was processed with the Shape-ACF, and the processing time is 0.0035 s on a 2.7 GHz CPU. Considering that candidate regions are provided by FG detection, and thus there is no need to process the entire 40×40 image, the processing time is projected to be less than 0.07 s/frame on the targeted microprocessor.

An ACF-based person detector may be trained and Shape-ACF developed to be used with the low-resolution images. ACFs may be used to differentiate objects, and detect persons from 8×8 and 32×32 thermopile array data. In addition, eBNNs may be adapted and trained so that they can also be applied to very-low resolution visible range camera images. Activations may be taken from eBNNs, and then ACF-based detection performed. A comprehensive accuracy and energy efficiency analysis and comparison may be performed between these approaches. It should be noted that for both ACF- and eBNN-based approaches, it is necessary to perform training on data captured from the wall-mounted sensors.

If multiple people can be detected/segmented from visible-range and thermopile images by using the aforementioned detection algorithms, this will provide the person count. However, to increase robustness, algorithms may be used to handle possible merge problems, and correctly segment out person(s). Autonomous counting of interacting people from a single overhead camera may be adapted to learn the size interval for a single person autonomously using a two-level hierarchical tracking structure and successfully handlings interactions between people such as merges/splits, shaking hands, and hugging. Average accuracy rates of 98.5% and 95% has been achieved on videos with normal traffic flow and videos with many cases of merges and splits, respectively. By learning the person-size bounds from video sequences, the necessary tolerance for different effects, such as clothing, carried items or different-height people may be determined.

With low resolution images, people may be segmented from the BG by using BG and edge subtraction. This step will yield a FG mask image with bounding boxes around each FG blob. To fill the possible holes (which may occur during FG segmentation), and to learn a more reliable color and size distribution for the FG blobs, an ellipse may be fit to the FG pixels in each bounding box, and OR operation performed between ellipse pixels and the corresponding FG pixels in the original mask. It is possible to then autonomously learn the person-size bounds. In addition, heads may be detected to segment people in merged blobs by incorporating data from thermal sensor as well.

A two-level detection method may be used to obtain sound signatures from microphone data. First, a detection scheme may be used based on the energy of an audio signal due to its low complexity. The audio signal will be sampled, and the energy of the signal samples will be compared to a threshold to make a decision regarding the presence or absence of human activity. This threshold will be designed by taking the human and human-induced sounds (e.g., door opening/closing, footsteps, sounds from home appliances) into account. Second, features may be extracted from the audio signal if and only if the energy of the audio signal samples is above a threshold.

Figure 11:
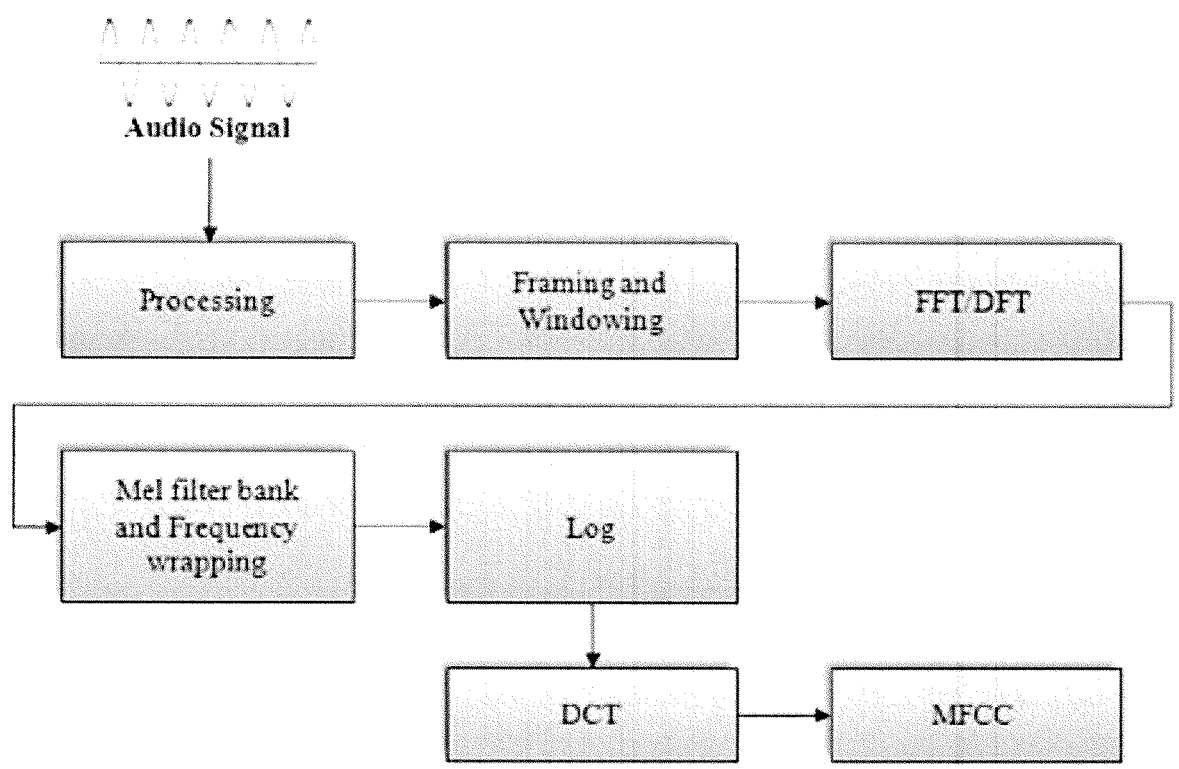
FIG. 11 is a schematic of Mel frequency Cepstral coefficients.

Mel Frequency Cepstral Coefficients (MFCC) may be used for audio features. The extraction steps are shown in FIG. 11. First, the audio is framed and windowed in overlapping steps. For each window, the power spectrum is computed using a Fast Fourier Transform or Discrete Fourier Transform. The spectral coefficients are then perceptually weighted by a non-linear map of the frequency scale called Mel-scaling. The next processing step computes the logarithm of the signal. The final stage is to further transform the Mel-weighted spectrum using Discrete Cosine Transform into "cepstral" coefficients. The system will compare the MFCC features extracted from the audio signal to a dictionary that will include various human/human-induced sound features. This two-level detection approach, described above, will reduce the energy consumption by limiting the computation of MFCC features to high-energy signal cases, and avoiding the triggering of modalities based only on the energy of the audio signal. In this approach, privacy is handled in multiple ways: (i) the raw signal is not saved, (ii) audio is processed locally, and is not sent to a cloud or a remote computing station.

Within each platform 10, the detection architecture uses the three local sensors 12, 14, and 16 and a platform-level fusion center (FC) programmed into processor 18. Each platform 10 may send its local observations to the platform-level FC of processor 18, which fuses the observations and produces a binary unit-level decision regarding the presence or absence of occupants. The decisions are then transmitted by platform 10 to a global FC embodied in hub 20 that can be programmed to make a global decision. Platform 10 observes different aspects/features of the occupants, and their observations are dependent. The dependence among sensor observations is taken into account and an optimal complete knowledge of the form and structure of the joint distribution of sensor observations is sought. Generally, the joint statistics of sensor observations are not available a priori. Moreover, the dependence structure of multivariate sensors can be quite complex and nonlinear. Simple dependence modeling through methods such as the use of multivariate normal model, is very limited and inadequate to characterize complex dependence among multi-model sensors. Copula-based dependence modeling provides a flexible and powerful approach for continuous multivariate distributions since it separates modeling univariate marginals from modeling the multivariate (dependence) structure. A copula, specified independently from marginals, is a multivariate distribution with uniform marginal distributions. The unique correspondence between the copula and any multivariate distribution is stated in Sklar's theorem, which is a fundamental theorem of copula theory. Copula-based fusion of heterogeneous sensors has attracted much attention recently, and we have obtained significant results in this area. A copula-based framework for the detection problem observed jointly by heterogeneous sensors may be used, where canonical correlation analysis and copula theory are combined to obtain a test statistic for detection. The utility of non-stationary dependence modeling with copulas by fusing heterogeneous data for detecting the presence of a phenomenon obtained a 52.9% increase in probability of detection. A copula-based estimation scheme improved the overall estimation performance by fusing observations from different sensors. More specifically, the mean-square error decreased 86.67% compared to independence-based fusion. Copula-based dependence modeling is attractive especially for characterizing complex dependence that exists among sensors, and its ability to improve the performance of inference tasks has been shown in the recent literature. A copula-based optimal fusion methodology to characterize the complex dependence among sensor observations for the platform-level detection may thus be used. Moreover, a "k out of n" fusion rule to fuse the platform-level decisions is preferred.

Consider the human attributes/features being monitored by the three sensor modalities on a sensor. A binary hypothesis testing problem is studied, where H1 and H0 denote the presence and absence of occupants, respectively. The $l^{th}$ sensor, $l \in \{1, 2, 3\}$, makes a set of N observations (or corresponding feature-level observations), $z_{ln}$, $n \in \{1,2,\ldots N\}$. These measurements may represent a time series (with n being the time index), spectral coefficients (with n being the frequency index), or some other feature vector. The vector $z_n=[z_{1n}, z_{2n}, z_{3n}]$ denotes the nth measurements at all the sensors. We assume that sensor observations are continuous random variables and conditionally independent and identically distributed (i.i.d.) over time. The collective measurements $z=[z_1, z_2, \ldots z_N]$ are received at the FC. Based on the joint characteristics of z, the FC decides whether a person is present or not in a region, and solves a hypothesis testing problem. As mentioned above, the joint distribution of sensor measurements is generally not known a priori. Using the copula theory, a multivariate joint PDF is modeled as production of marginal PDFs and the copula density as shown below:

$$f(x_1, \ldots, x_d) = \left(\prod_{m=1}^{d} f_m(x_m)\right) c(F_1(x_1), \ldots, F_d(x_d))$$

Let $f(z_{ln}|H_1)$ and $f(z_{ln}|H_0)$ be the pdfs of the measurement at $l^{th}$ sensor and $n^{th}$ time instant under $H_1$ and $H_0$ hypotheses, respectively. Using Sklar's theorem, the joint PDF of z under hypothesis $H_k$, k=0, 1, is given by:

$$f(z_1, \ldots, z_N | H_k) = \prod_{n=1}^{N}\left(\prod_{i=1}^{3} f(z_{ln} | H_k)\right) c(u_{1n}, u_{2n}, u_{3n} | \phi),$$

where $u_{ln}$ is the marginal CDF for sensor l at time instant under hypothesis $H_k$, k=0, 1 and φ is the parameter of copula c.

Without any prior knowledge of the phenomenon of interest, the marginal PDFs $f(z_{ln})$ can be estimated non-parametrically, and the marginal CDFs $u_{ln}$ can be determined by the Empirical Probability Integral Transforms (EPIT). The estimate of uniform random variables $u_{ln}$ is obtained by using EPIT:

$$\hat{F}(\cdot) = \frac{1}{N}\sum_{n=1}^{N+1} 1_{z_{ln}<\{\cdot\}}, \hat{u}_{ln} = \hat{F}(z_{ln}),$$

where $1\{\cdot\}$ is the indicator function

Kernel density estimators provide a smoothed estimate of true density by choosing the optimal bandwidth so that an accurate estimate is achieved. Leave-one-out cross-validation method is applied to choose the kernel bandwidth. For a kernel K, the optimal bandwidth h* is obtained by minimizing the cross-validation estimator of risk $\hat{J}$. The risk estimator can be easily acquired using an approximation.

The best copula c* (maximum likelihood) is selected from a predefined library of copulas$\{c_m: m=1, \ldots, M\}$. Since sensor observations are independent over time, the likelihood ratio test statistic is given as:

$$\Lambda(z) = \frac{\prod_{n=1}^{N} f_1(z_{1n}, z_{2n}, z_{3n} | H_1)}{\prod_{n=1}^{N} f_0(z_{1n}, z_{2n}, z_{3n} | H_0)},$$

where $f_1$ and $f_0$ denote the joint PDFs under alternative and null hypotheses, respectively. Using the copula-based dependence modeling approach and taking log on both sides of likelihood ratio test statistic, the log test statistic can be expressed in terms of the optimal copula densities, $c^*_1$ and $c^*_0$, respectively under $H_1$ and $H_0$, as $$\log \Lambda(z) = \sum_{n=1}^{N}\sum_{l=1}^{3} \log \frac{\hat{f}_1(z_{ln})}{\hat{f}_0(z_{ln})} + \sum_{n=1}^{N} \log \frac{c_1^*(\hat{u}_{1n}^1, \hat{u}_{2n}^1, \hat{u}_{3n}^1 | \hat{\phi}_1^*)}{c_0^*(\hat{u}_{1n}^0, \hat{u}_{2n}^0, \hat{u}_{3n}^0 | \hat{\phi}_0^*)},$$

where $\hat{f}_k(z_{ln})$ is the estimated marginal PDF, $\hat{u}_{ln}^K = F(z_{ln}|H_k)$ denotes the estimated CDF, for sensor l at time instant n and $\hat{\phi}_k^*$ is the parameter of the optimal copula $c_k^*$, under hypothesis $H_k$ (k=0, 1). The optimal fusion rule is given by $$\log \Lambda(z) \underset{H_0}{\overset{H_1}{\gtrless}} \eta,$$

where η is the threshold for the test.

Within platform 10, the copula-based optimal fusion rule may be employed for the detection of occupant(s). Once a sensor and its neighbors detect the presence of occupant(s) and send their decisions to the global FC, "k out of N" fusion methodology will be implemented to achieve a global decision, where if k or more detectors decide hypothesis $H_1$, then the global decision is $H_1$. This decision-level fusion of the outputs by individual sensors will improve the detection performance and reduce false alarm rates.

An energy-efficient hierarchical model may be used, in which three sensors collaborate to make a decision. In this model, the sensor modality at the lowest level (referred to $SM_1$), will be operational for longer periods of time compared to the sensors at higher levels ($SM_2$ and $SM_3$). For instance, microphone can be at the lowest level, since it is the most energy efficient among all sensors 10. Using the same logic, the thermopile array or the camera are placed at the next levels based on their energy consumption characteristics and operating cycles. A sleep/wake-up scheduling strategy may be used for each sensor such that it limits the energy consumption while providing low number of false alarms and high detection performance.

Figure 12:
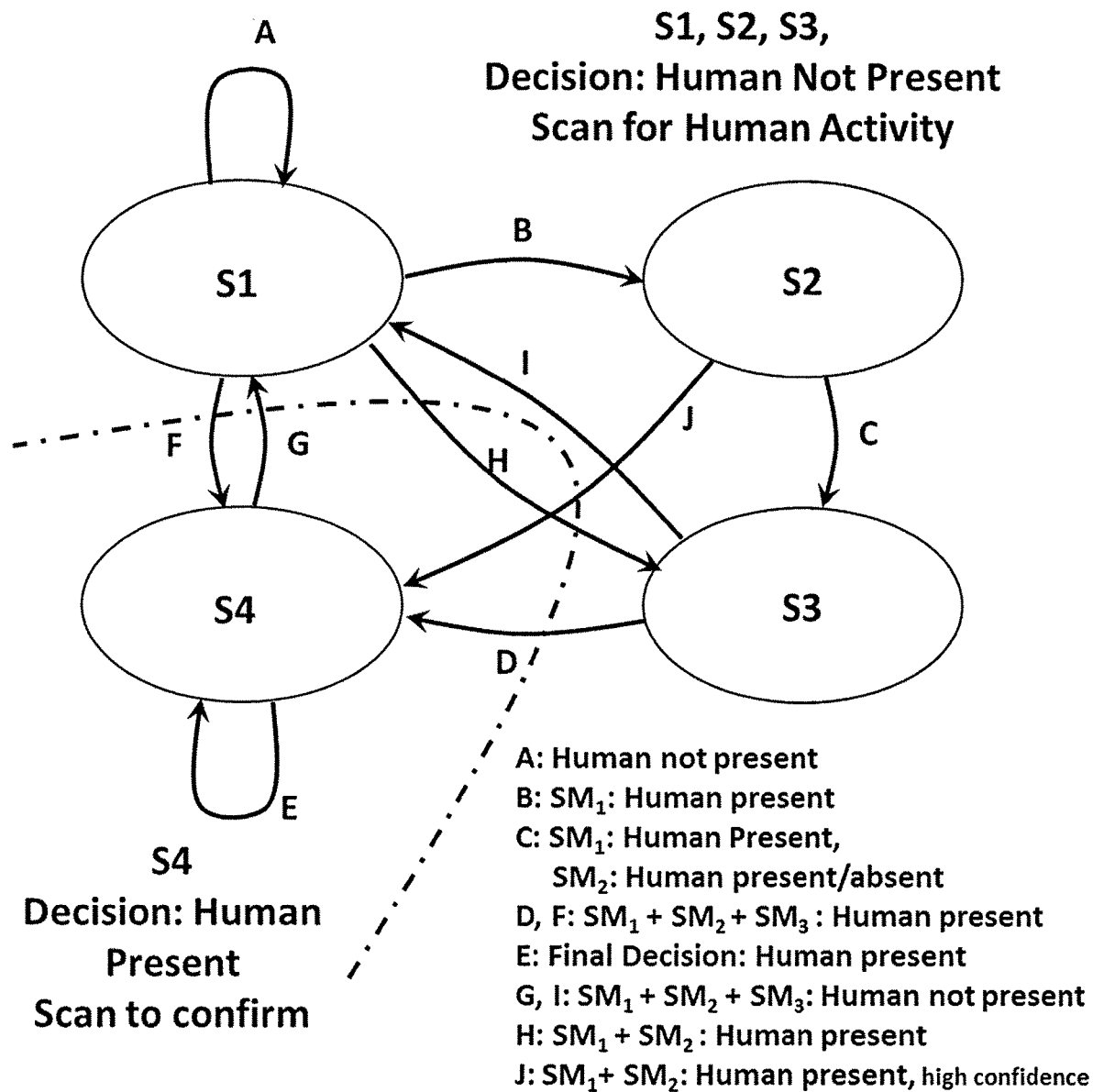
FIG. 12 is a state diagram of a scheduling methodology according to the present invention.
Figure 13:
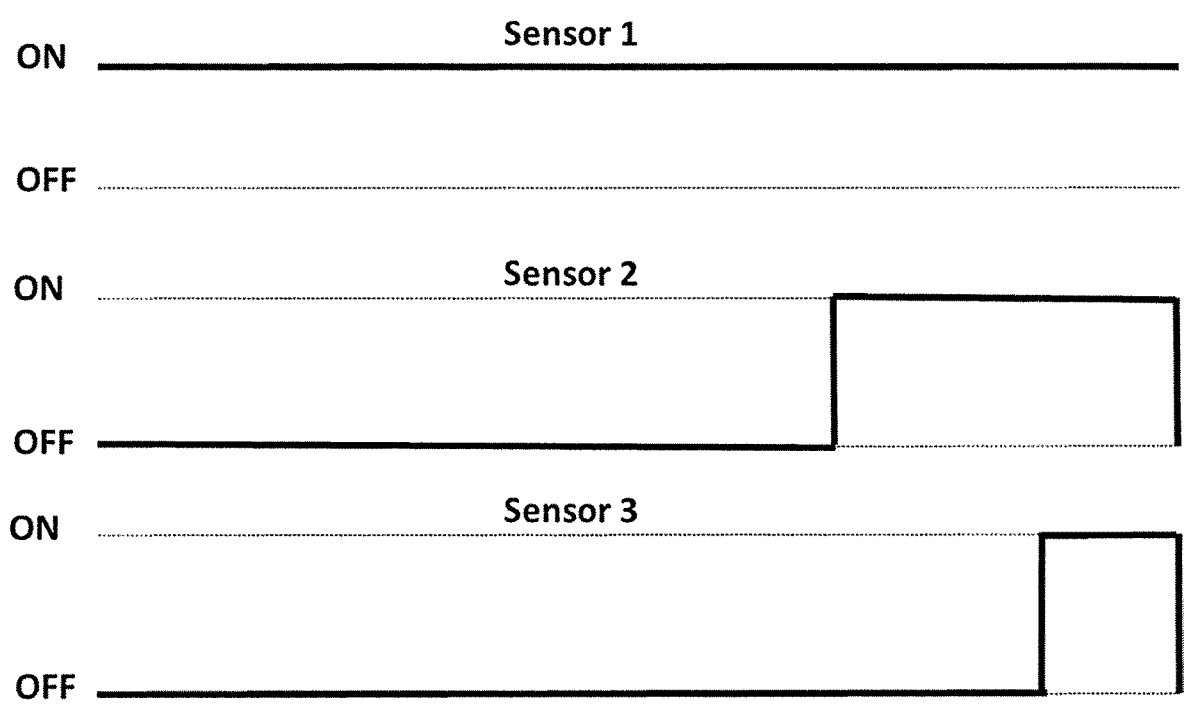
FIG. 13 is a timing diagram showing the relative active times of different sensors.
Figure 14:
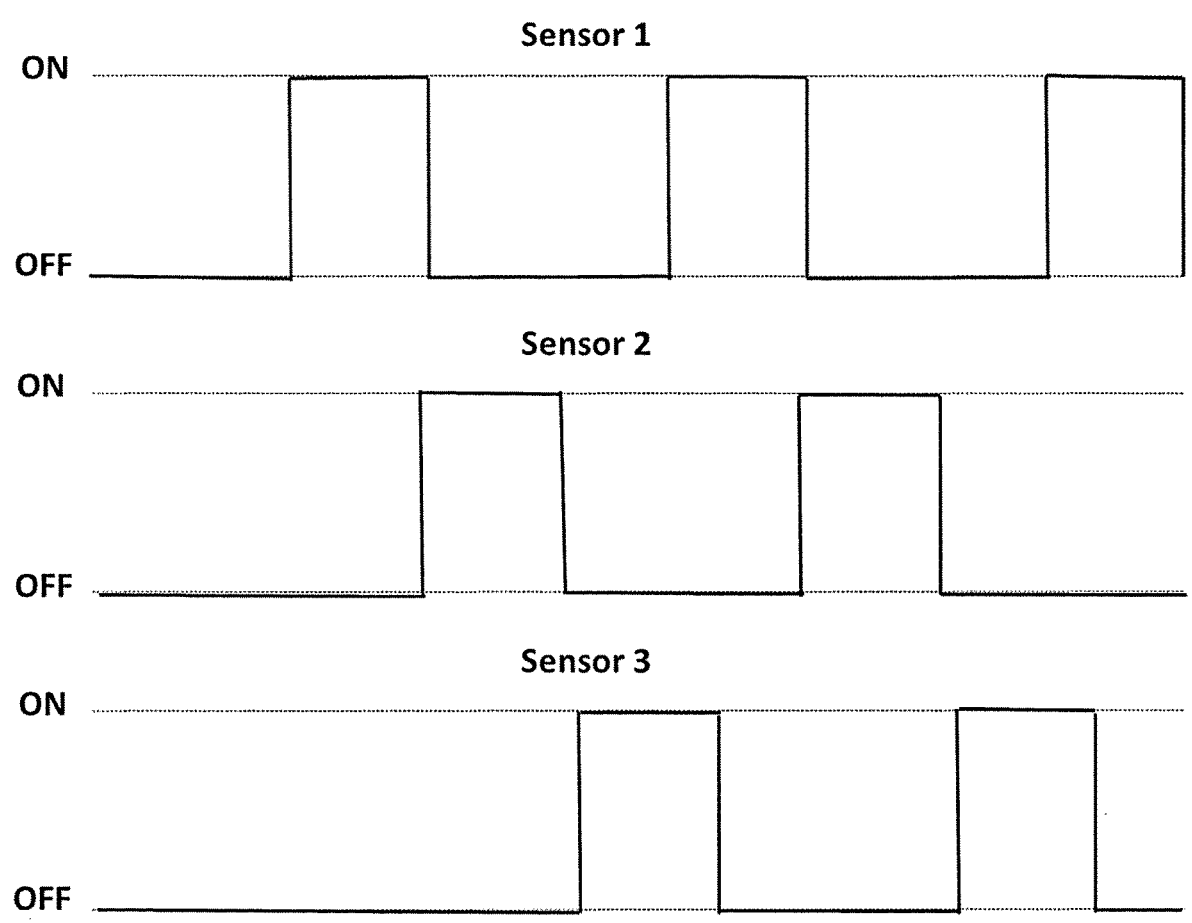
FIG. 14 is a second timing diagram showing the relative active times of different sensors.
Figure 15:
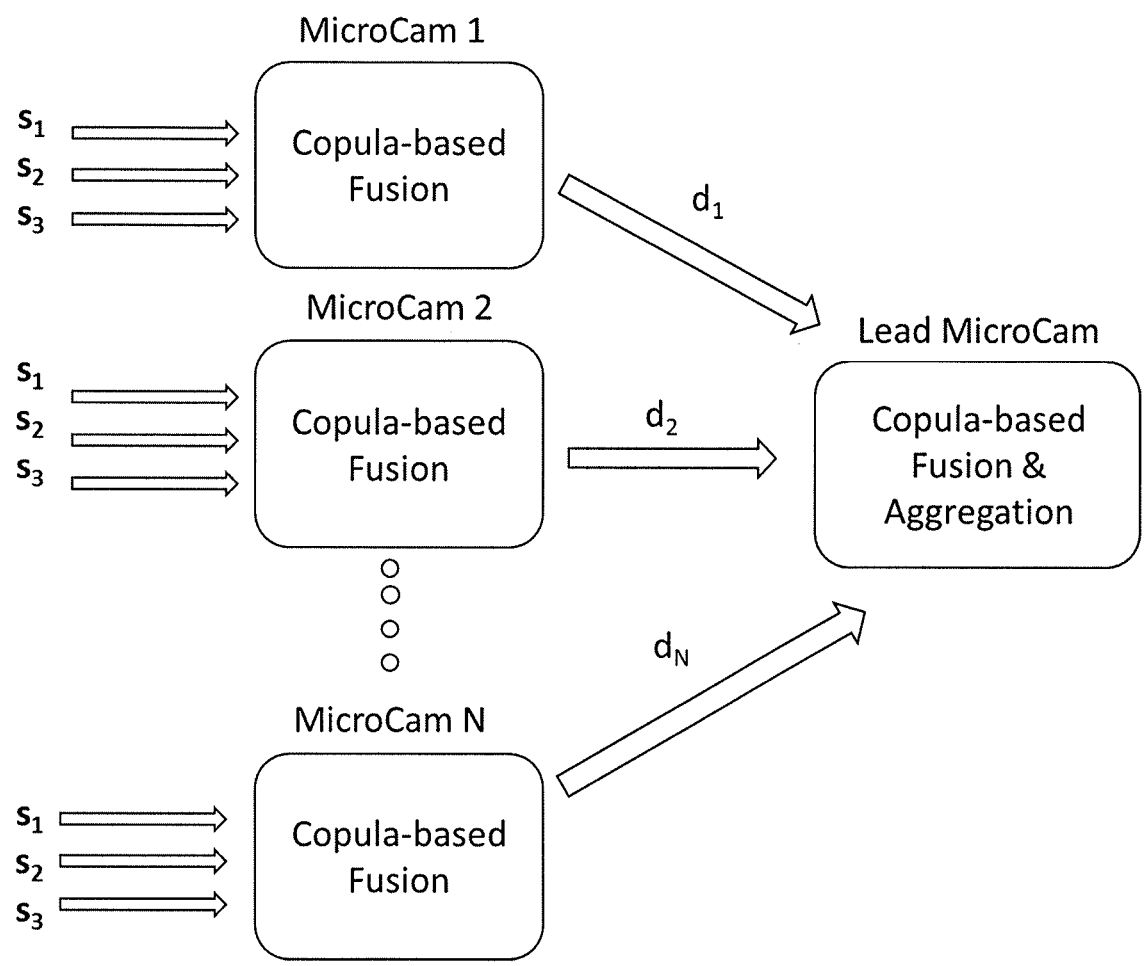
FIG. 15 is a schematic of fusing information from multiple sensor modalities according to the present invention.

As shown in FIG. 12, there are four states (S1-S4) in sensor 10. States S1 and S4 are the listening states, where sensor 10 listens/scans the surroundings to detect any human activity. At S1, humans are absent and sensor 10 scans to detect presence. At S4, human presence is already detected, and sensor 10 scans to confirm. States S2 and S3 are intermediate states, where sensor 10 incorporates information from different sensor modalities to improve detection accuracy. Since the unit will be operating mostly in State S1 or S4, the energy usage of these states will contribute the most to the total energy consumption, requiring a careful design of the scheduling of sensors in states S1 and S4. A scheduling method may be used to design a sleep-wake cycle for all three sensors. It should be noted that the sleep-wake cycle of sensors in state S1 is different from that of state S4, and are designed according to the detection task these states have to perform.

A reliable yet energy efficient decision making system for state S1 involves a scenario where $SM_1$ will be ON for certain duration (e.g. 47 ms for the microphone) every $t_1$ s, $SM_2$ every $t_2$ s, and $SM_3$ every $t_3$ s, where $t_3 > t_2 > t_1$, and $SM_3$ will remain ON for a shorter period than $SM_2$. Use of a priori information about daily schedules of occupant can allow longer sleep durations, and longer battery life for the units. However, schedules will differ for different households/companies, and there is no "one-size-fits-all" scheduling. Initially, $t_1$, $t_2$, $t_3$ are chosen such that misdetections are avoided. For instance, microphone becoming ON every 1 or 2 s, and other sensor waking up every 2 minutes. It should be noted that energy calculations were made with these assumptions. Research may be performed to autonomously learn schedules, perform optimization and increase energy efficiency, and battery life even further.

At S4, the presence of the humans is already decided, and sensor 10 has triggered the HVAC system. The system needs to be turned off as soon sensor 10 decides on the absence of human(s). At S4, the sleep-wake cycle is changed from the one used in state S1. Here, each sensor independently turns on and off according to predetermined cycles. Sleep-wake cycles for the three sensors will be designed such that overlap between different modalities in a time frame is a minimum.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. An occupancy detection system, comprising:
a plurality of object detectors, wherein each of the plurality of object detectors includes
a camera aligned to capture and output an optical image of a field of view;
a microphone for detecting sounds in the field of view and outputting a signal reflecting a detected sound;
a motion sensor for detecting movement within the field of view and outputting a signal reflecting a detection of movement;
a battery coupled to the motion sensor, the camera, and the microphone and acting as a sole power source for the operation of the motion sensor, the camera, and the microphone; and
a microcontroller coupled to the motion sensor, the camera, and the microphone that is programmed to locally make a binary decision limited to whether a human is present in the field of view after the motion detector detects movement in the field of view based upon the optical image and the signal reflecting the detected sound and to wirelessly output only the binary decision whether the human is present or absent in the field of view without transmitting any data relating to the optical image or the signal reflecting a detected sound;
a central hub wirelessly connected to the plurality of object detectors configured to receive the binary decision limited to whether a human is present in the field of view from each of the plurality of object detectors and including a processor programmed to make a global occupancy decision for a location enclosing the field of view using a "k out of N" fusion method to achieve a global decision whether a human is present based on the binary decision received from all of the plurality of object detectors.

2. The occupancy detection system of claim 1, wherein the microcontroller of each of the plurality of object detectors is programmed to determine whether there is a predetermined object in the field of view using a modified machine learning network to identify a foreground object in visible range camera images.

3. The occupancy detection system of claim 2,
wherein the microcontroller of each of the plurality of object detectors is programmed to identify multiple foreground objects in a visible range camera image.

4. The occupancy detection system of claim 2,
wherein the microcontroller is programmed to identify and differentiate the source of motion.

5. The occupancy detection system of claim 3,
wherein the microcontroller of each of the plurality of object detectors is programmed to count the multiple foreground objects identified in a visible range camera image.

6. The occupancy detection system of claim 1,
wherein the microcontroller of each of the plurality of object detectors is programmed to determine whether there is a predetermined object in the field of view using an embedded binarized neural network to process an image.

7. The occupancy detection system of claim 6,
wherein the microcontroller of each of the plurality of object detectors is programmed to identify whether there are multiple predetermined objects in the field of view using an embedded binarized neural network to process the image.

8. The occupancy detection system of claim 7,
wherein the microcontroller of each of the plurality of object detectors is programmed to count the multiple foreground objects identified in the image.

9. The occupancy detection system of claim 1,
wherein the microcontroller of each of the plurality of object detectors is programmed to determine whether there is a predetermined object in the field of view based on the signal reflecting the detected sound.

10. The occupancy detection system of claim 9,
wherein the microcontroller of each of the plurality of object detectors is programmed to determine whether there is a predetermined object in the field of view by comparing an amount of energy in the signal reflecting the detected sound against a threshold.

11. The occupancy detection system of claim 10,
wherein the microcontroller of each of the plurality of object detectors is programmed to determine whether there is a predetermined object in the field of view by extracting at least one feature from the signal reflecting the detected sound if the amount of energy in the signal exceeds the threshold.

12. The occupancy detection system of claim 11,
wherein the microcontroller of each of the plurality of object detectors is programmed to determine whether there is a predetermined object in the field of view using mel frequency cepstral coefficients.

13. The occupancy detection system of claim 1,
wherein the microcontroller of each of the plurality of object detectors is programmed to make a final determination whether the predetermined object is in the field of view based on consideration of a first preliminary determination whether the predetermined object is in the field of view that is based upon optical image, consideration of a second preliminary determination whether the predetermined object is in the field of view that is based upon the signal reflecting the detection of movement, and a third preliminary determination whether the predetermined object is in the field of view based upon the signal reflecting the detected sound.

14. The occupancy detection system of claim 13,
wherein the microcontroller of each of the plurality of object detectors is programmed to make the final determination using a fusion algorithm that considers the first preliminary determination, the second preliminary determination, and the third preliminary determination.

15. A method of detecting an object, comprising the steps of:
providing a plurality of object detectors, wherein each object detector comprises a camera aligned to capture and output an optical image of a field of view, a microphone for detecting sounds in the field of view and outputting a signal reflecting a detected sound, a motion sensor for detecting movement within the field of view and outputting a signal reflecting a detection of movement, and a battery coupled to the motion sensor, the camera, and the microphone and acting as a sole power source for the operation of the motion sensor, the camera, and the microphone;
using a microcontroller in each of the plurality of object detectors that is coupled to the motion sensor, the camera, and the microphone to make a binary decision limited to whether a human is present or absent in the field of view based upon the optical image and the signal reflecting the detected sound; and
wirelessly outputting only the binary decision whether the human is present or absent in the field of view without transmitting any data relating to the optical image or the signal reflecting a detected sound; and
using a central hub wirelessly connected to the plurality of object detectors configured to receive the binary decision limited to whether a human is present in the field of view from each of the plurality of object detectors and including a processor programmed to make a global occupancy decision for a location enclosing the field of view using a "k out of N" fusion method to achieve a global decision whether a human is present based on the binary decision received from all of the plurality of object detectors.

16. The method of claim 15, wherein the step of using the microcontroller in each of the plurality of object detectors to make a determination whether the predetermined object is in the field of view comprises the steps of making a first preliminary determination whether the predetermined object is in the field of view that is based upon the visible range image, making a second preliminary determination whether the human is in the field of view that is based upon the signal reflecting the detected sound, and making a final determination whether the human is in the field of view using multi-modal fusion.

* * * * *